United States Patent [19]

Watanabe et al.

[11] Patent Number: 5,098,761
[45] Date of Patent: Mar. 24, 1992

[54] OPTICAL RECORDING MEDIUM

[75] Inventors: Yuji Watanabe, Kyoto; Gentaro Ohbayashi, Kusatsu; Kusato Hirota, Otsu, all of Japan

[73] Assignee: Toray Industries, Inc., Tokyo, Japan

[21] Appl. No.: 461,192

[22] Filed: Jan. 5, 1990

[30] Foreign Application Priority Data

Jan. 9, 1989 [JP] Japan .................................. 1-3412

[51] Int. Cl.$^5$ .............................................. B32B 9/00
[52] U.S. Cl. ................................. 428/64; 428/65; 428/76; 428/668; 428/689; 428/697; 428/913; 346/76 L; 346/135.1; 369/283; 369/288
[58] Field of Search ..................... 369/272, 288, 283; 428/64, 65, 76, 689, 697, 913; 346/76 L, 135.1

[56] References Cited

U.S. PATENT DOCUMENTS

| | | | |
|---|---|---|---|
| 4,069,487 | 1/1978 | Kasai et al. | 428/413 |
| 4,676,646 | 6/1987 | Strand et al. | 356/387 |
| 4,775,603 | 8/1988 | Fujii | 428/697 |
| 4,847,132 | 7/1989 | Takao et al. | |

FOREIGN PATENT DOCUMENTS

| | | | |
|---|---|---|---|
| 1209698 | 8/1986 | Canada . | |
| 58-215744 | 12/1983 | Japan . | |
| 59-110052 | 6/1984 | Japan . | |
| 60-131659 | 7/1985 | Japan . | |
| 0009040 | 1/1988 | Japan | 428/64 |
| 63-103453 | 5/1988 | Japan . | |

OTHER PUBLICATIONS

Japenese Patent J62033348-A.

Primary Examiner—Patrick J. Ryan
Assistant Examiner—Elizabeth Evans
Attorney, Agent, or Firm—Armstrong, Nikaido, Marmelstein, Kobovcik & Murray

[57] ABSTRACT

An optical recording medium includes a substrate, a recording layer and a dielectric layer formed on said substrate, said dielectric layer containing a mixture containing at least a chalcogen compound and fluoride compound. The optical recording medium has excellent long term storage stability, excellent recording and erasing cycle characteristics and excellent recording and/or erasing characteristics.

14 Claims, No Drawings

OPTICAL RECORDING MEDIUM

BACKGROUND OF THE INVENTION

1. Field of the Invention

This invention relates to optical recording media capable of recording and reading information by irradiation of a light beam.

2. Description of the Prior Art

In conventional optical recording media, the characteristics of the recording layer become degraded during storage and transportation, because the recording layer is susceptible to oxidative corrosion by moisture and oxygen in air. And in the case of rewritable optical recording media, the recording layer becomes unusable because its recording and erasing characteristics are degraded after a number of recording and erasing cycles. Therefore, it has been customary to form, by the well-known thin film deposition method, a dielectric layer by use of dielectric compounds without oxygen such as aluminum nitrides, silicon nitrides, $MgF_2$, ZnS, $AlF_3$, etc, as disclosed in Canadian Patent No. 1,209,698 (corresponding to Japanese patent application Kokai publication No. 59-110052) and in Japanese patent application Kokai publication No. 60-131659, or oxides such as $SiO_2$, SiO, $Al_2O_3$, $TiO_2$, etc, as disclosed in Japanese patent application Kokai publication No. 58-215744 or a mixture of chalcogen compounds such as ZnS and oxides such as $SiO_2$ as disclosed in U.S. Pat. No. 4,847,132 (corresponding to Japanese patent application Kokai publication No. 63-103453) as the dielectric layer for protecting the recording layer.

The dielectric layer must have the function of protecting the recording layer during storage of the optical recording media.

And also, it must possess excellent mechanical characteristics and heat stability, because the dielectric layer provided on the optical recording medium is exposed to thermal and mechanical stresses at the time of recording and erasing.

At the time of recording, erasing and reading, on the other hand, the optical recording medium as the integral assembly of essential constituents such as a substrate, a recording layer, a dielectric layer, and the like, must absorb efficiently an irradiated beam of light and must reflect it suitably. Therefore, it is necessary that thickness of each layer composed of the optical recording medium should be arranged taking into consideration optical requirements. From the aspect of this optical design, the optical constants of the dielectric layer such as refractive index and extinction coefficient and its film thickness are important factors.

The important properties of the dielectric layer are those which satisfy the recording layer protective characteristics described above simultaneously with the thermal and mechanical requirements and optical requirements. The dielectric layers in accordance with the prior art technique are not always the best selection in these respects.

If the dielectric is an oxide or nitride, it cannot sufficiently shield oxygen and moisture and the characteristics of the recording layer become deteriorated by them. Moreover, because the dielectric layer itself is likely to peel or crack during storage especially in a high temperature and high humidity environment, the prevention of degradation of the characteristics of the recording layer is not sufficiently high. Further, diffusion of oxygen in the oxide or nitrogen in the nitride into the recording layer with the recording and erasing cycles is likely to invite degradation of the recording or erasing characteristics.

When $MgF_2$ or ZnS is used either alone or substantially a single substance, cracks are likely to occur in the case of $MgF_2$ and peel is likely to occur in the case of ZnS in the high temperature and high humidity environment. Accordingly, the recording layer protective characteristics are not sufficiently high, either.

In the case of the dielectric layer using the mixture of a chalcogen compound such as ZnS, and an oxide such as $SiO_2$, the intrinsic stress occurring in the films of both ZnS and $SiO_2$ functions as compressive stress if the films are formed by vacuum deposition. Therefore, this combination cannot relax the stress and the dielectric layer sometimes peels. Furthermore, oxygen in the oxide diffuses into the recording layer with the recording and erasing cycles and invites degradation of the recording and erasing characteristics.

SUMMARY OF THE INVENTION

It is therefore an object of the present invention to provide an optical recording medium which is excellent in stability during storage for an extended period.

It is another object of the present invention to provide an optical recording medium having excellent recording and erasing cycle characteristics (cyclability).

It is still another object of the present invention to provide an optical recording medium which has excellent recording and/or erasing characteristics.

In other words, the present invention relates to an optical recording medium comprising a substrate, a recording layer and a dielectric layer formed on said substrate, said dielectric layer comprising a mixture containing at least a chalcogen compound and a fluoride compound.

DESCRIPTION OF THE PREFERRED EMBODIMENTS

In the mixture of the present invention containing the chalcogen compound and the fluoride compound, the "chalcogen compound" represents sulfides, selenides and tellurides. Examples thereof include ZnS, SnSe, ZnTe, PbS, PbSe and PbTe, though the present invention is not limited particularly to them.

The "fluoride compound" represents fluorides of metals of Groups I, II and III of the Periodic Table. Examples thereof include $MgF_2$, $CeF_3$, $ThF_4$, LiF, $LaF_3$, $NdF_3$, $5Na.3AlF_3$, $Na_3AlF_6$ and $CaF_2$.

Furthermore, the "mixture" represents those materials in which two or more materials are mixed together at the several nanometers or below scale or at the order of an atomic level or those materials which are aggregates of grains of several nanometers or below and part or the whole of the grains of which are arranged in a regular laminar structure in the unit of several nanometers or below.

Studies made by the inventors of the present invention on the dielectric layer to be used for the optical recording media have revealed that the chalcogen compound such as ZnS formed by the well-known thin film deposition method such as vacuum deposition generally generates a compressive stress inside the film while the fluoride compound such as $MgF_2$ or $CeF_3$ generates a tensile stress inside the film. These intrinsic stresses often result in peel and crack. Since the dielectric layer of the present invention comprises the mixture which contains the chalcogen compound and the fluoride compound, the intrinsic stress in the dielectric layer is relaxed.

Because the intrinsic stress is very small or none, the dielectric layer does not crack. As its adhesion with the recording layer is strong, it does not peel.

The dielectric layer of the present invention can provide extremely excellent recording layer protective characteristics.

Even when the recording and erasing cycles are repeated, mechanical breakdown of the dielectric layer and peel between the recording layer and the dielectric layer due to the heat cycles of heating and cooling at the time of repetition of recording and erasing do not occur and cyclability is excellent.

The dielectric layer of the present invention constituted of the mixture containing the chalcogen compound and the fluoride compound is free from the problem that diffusion of oxygen in the dielectric layer into the recording layer with the repeated recording and erasing cycles causes degradation of the cyclability.

Since the dielectric layer is comprised the mixture of the chalcogen compound such as ZnS having a large refractive index of 2.3 or ZnTe having a large refractive index of 2.7 and the fluoride compound such as $MgF_2$ having a small refractive index of 1.37 or $CeF_3$ having a small refractive index of 1.6, the refractive index can be regulated to any intermediate value between those of the chalcogen compound and fluoride compound by varying the mixing ratio of the chalcogen compound to the fluoride compound. Therefore, since the use of this dielectric layer makes it possible to adopt the most appropriate design of the layer structure for recording and erasing while satisfying the recording layer protective characteristics, its stability in storage is excellent and good recording sensitivity and/or erasability can be obtained. The preferred combinations of the chalcogen compound with the fluoride compounds are ZnS and $MgF_2$, ZnSe with $MgF_2$, ZnTe with $MgF_2$, ZnS with $CeF_3$, and ZnS with $ThF_4$.

Since this dielectric layer has a high heat resistance, maintain sufficient mechanical characteristics even when heated repeatedly with the recording and erasing cycles and do not undergo breakdown, they have excellent cyclability. Furthermore, since this layer has low hygroscopicity and an excellent ability to shield oxygen and moisture, it is excellent for protecting the recording layer and providing the optical recording media with high stability for a long period.

Although the mixing ratio of the chalcogen compound to the fluoride compound is not particularly limited, it is preferably from 100:1~1:20 in terms of a molar ratio, more preferably from 70:1~1:5 and most preferably from 50:1~1:2. The range of the mixing ratio of the chalcogen compound to the fluoride compound described above can reduce the occurrence of peel and crack, provides the most suitable range of the refractive index to the dielectric layer and makes it possible to employ an optically optimum design of the laminar structure.

Particularly when the composition ratio is within the range of 50:1~1:2 in the combination of ZnS with $MgF_2$ or ZnSe with $MgF_2$, the structure of the layer becomes amorphous, or an aggregate of very fine crystalline regions. Because the structure of the dielectric layer becomes compact, the ability to shield oxygen and moisture becomes extremely excellent. In addition, since the recording sensitivity is high and the erasability is large, too, the combination of ZnS with $MgF_2$ or ZnSe with $MgF_2$ is most preferred.

The thickness of the dielectric layer is preferably within the range of 3~500 nm, more preferably within the range of 10~300 nm. The thickness described above can shield sufficiently oxygen and moisture and neither peeling nor cracking occurs easily within this range of the thickness.

In order to further relax the intrinsic stress or regulate the refractive index, metals, metalloids and their oxides, nitrides and carbides may be added to the dielectric layer within the range in which recording and/or erasing characteristics and cyclability are not remarkably deteriorated.

The optical recording medium in the present invention comprises at least a substrate, and a recording layer and a dielectric layer that are formed on the substrate, and the dielectric layer can be disposed on one or both surfaces of the recording layer adjacent thereto.

A known optical recording layer can be used as the recording layer in the present invention. It is possible to use those materials which cause a change in the crystal structure of the recording layer by the irradiation of a laser beam focused on the recording layer, or in other words, those materials which can record information through the phase change (e.g. from the crystalline state to an amorphous state or vice versa or from the hexagonal crystal to a cubic crystal or vice versa), for example. Examples of such materials are a Te-Ge alloy, Sb-Te-Ge alloy, Sn-Te-Se alloy, In-Se alloy and those modified by adding small amounts of metals to these alloys.

A particular example of a preferred recording layer from the aspect of recording characteristics comprising antimony, germanium and tellurium and at least one metal selected from the group consisting of Pd, Ni, Ag and Au.

A recording layer constituted of the composition expressed by the following formula is used more preferably because it has excellent recording and erasing characteristics:

$$(Pd_xSb_yTe_{1-x-y})_{1-z}(Te_{0.5})_z$$

where
$0.01 \leq x \leq 0.1$
$0.45 \leq y \leq 0.65$
$0.2 \leq z \leq 0.4$
with each of x, y, z and 0.5 representing the atomic fraction of each element.

An example of the material for recording information by utilizing the magneto-optical effect is TbFeCo.

Those substrates which are used for the conventional optical recording media, such as plastics, glass, aluminum, and the like, can be used in the present invention. A transparent material is used preferably as the substrate when any influences of dust or the like adhering to the recording medium must be avoided by effecting recording, erasing or reading by the focused beam from the substrate side. Examples of the materials described above are a polyester resin, an acrylate resin, a polycarbonate resin, an epoxy resin, a polyolefin resin, a styrene resin, glass, and so forth. Preferred are polymethyl methacrylate, polycarbonate and epoxy resin because they have a small optical birefringence and can be molded easily. Though the thickness of the substrate is not particularly limited, the thickness in the range from 10 μm to 5 mm is preferred because the influences of dust become smaller when recording, erasing or reading is made from the substrate side, the numeric aperture of an objective can be made greater when recording, reading or erasing is made by the focused beam and recording density can be improved because pit size can be made smaller.

The substrate may be either flexible or rigid. The flexible substrate can be used in a tape form, a card form or a round sheet form. The rigid substrate can be used in a card form or a disk form.

The light used for recording, reading or erasing the optical recording medium of the present invention is a laser beam or a strobe light, and a semiconductor laser beam is particularly preferred because the light sources can be made compact, their power consumption is low and modulation is easy.

The optical recording medium of the present invention is composed of a recording layer and a dielectric layer provided on a substrate, wherein the dielectric layer comprises a mixture containing at least a chalcogen compound and a fluoride compound and it may have a structure, for example, wherein the recording layer is formed on the substrate and the dielectric layer of the present invention is formed on the recording layer, or a structure wherein the first dielectric layer, the recording layer and the second dielectric layer are laminated sequentially in that order on the substrate. Needless to say, the present invention does not exclude the addition of other layers to improve various properties so long as they do not remarkably deteriorate the object of the invention.

When signals are read by utilizing the change in the reflectance of the recording layer in the present invention, a reflecting layer of a metal (e.g. Al, Au, NiCr, Hf, etc.) may be disposed on one surface of the recording layer opposite to the incident surface of the beam. Furthermore, an intermediate layer may be interposed between the recording layer and the reflecting layer, and the dielectric layer of the present invention can be used as this intermediate layer.

The optical recording medium having the structure wherein the recording layer, the dielectric layer and the reflecting layer which is disposed whenever necessary, are disposed on the substrate can be used as a single sheet by coating a resin layer such as a layer of a UV curing resin on the shaped surface of the layers or may have an air sandwich structure, an air incident structure or a laminated structure for lamination with other member or with another substrate of the same kind.

The well-known thin film deposition method such as vacuum evaporation, sputtering, ion plating and CVD (Chemical Vapor Deposition) can be employed in order to form the recording layer, the dielectric layer and the reflecting layer which is disposed whenever necessary. In the case of vacuum evaporation, the dielectric layer comprising a mixture containing a chalcogen compound and a fluoride compound can be formed by co-evaporating the materials containing the chalcogen compound and the fluoride compound from separate evaporation sources or by mixing the materials containing the chalcogen compound and the fluoride compound in a predetermined mixing ratio and evaporating the mixture from one evaporation source. In the case of sputtering, a target made of a chalcogen compound material and a target made of a fluoride-containing material are co-sputtered or a target prepared by mixing the chalcogen compound material and the fluoride-containing material in a predetermined mixing ratio is sputtered.

Next, the method of forming the optical recording medium of the present invention composed of the substrate, the first dielectric layer, the recording layer and the second dielectric layer will be described by way of example.

A polycarbonate disk is used as the substrate and co-sputtering is effected by use of a ZnS target and a target containing at least one member of $MgF_2$ and $CeF_3$ so as to form the dielectric layer. Next, the recording layer is formed by sputtering on the dielectric layer by use of the target of the recording layer material and another dielectric layer is formed on this recording layer in the same way as above.

The sputtering method is not particularly limited. For example, RF magnetron sputtering in an Ar (argon) gas can be used, and it is effective to rotate the substrate in order to uniform the composition and the film thickness on the substrate.

In the method described above, the composition of the dielectric layer is controlled by the deposition rate from each target. More particularly, the relation between the power supplied to each target and the deposition rate is examined in advance and a power corresponding to a desired deposition rate can be supplied or a supply power can be controlled by monitoring the deposition rate with a quartz crystal thickness monitor, for example.

The degree of vacuum during sputtering is not particularly limited and is approximately from $5 \times 10^{-2}$ Pa to approximately 1 Pa, for example.

Now the present invention will be described with reference to examples thereof and comparative examples.

The characteristics described in the examples and comparative examples are evaluated by the following methods.

(1) Recording and erasing characteristics (dynamic characteristics):

While a disk substrate optical recording medium was being rotated, the recording layer was uniformly crystallized (initialized) by irradiating continuously a semiconductor laser beam having a wavelength of 830 nm which was focused by an objective having a numeric aperture of 0.5, from the substrate side. Thereafter, recording (conversion to an amorphous state) was carried out by a semiconductor laser beam of 10~15 mW modulated to a frequency of 2.5 MHz~5.5 MHz and duty of 50% at a linear velocity of 6.0 m/sec~15.0 m/sec by use of the same optical system as described above. After writing, the intensity of the semiconductor laser beam was changed to 0.7 mW to scan the written portion and to read the recorded signal.

After a semiconductor laser beam of 3 mW~15 mW was once irradiated to the recorded portion at a linear velocity of 2.0 m/sec~15 m/sec to erase (crystallize) the recorded signal, reading was effected under the same condition as described above. The carrier intensity and noise level of the read signal after recording and erasing were measured by a spectrum analyzer to determine a carrier-to-noise ratio (C/N) under the condition of a bandwidth of 30 kHz, and the erasability was determined as the difference in the carrier intensity between the time of recording and the time of erasing.

(2) Cyclability (static characteristics):

A Pyrex glass substrate optical recording medium was heated to 250° C. in advance in an oven to crystallize the recording layer and a semiconductor laser beam of 830 nm focused by an optical system having a numerical aperture of 0.5 was pulse-modulated and irradiated from the substrate side so as to effect recording (conversion to the amorphous state) and erasing (crystallization). The difference in reflectance between recording (amorphous state) and erasing (crystallization) was read by using a laser beam. The laser beam pulse at the time of recording had a laser power of 15 mW and a pulse width of 100~400 nsec and the laser beam pulse at the time of erasing had a laser power of 2.8~7.0 mW and a pulse width of 200 nsec~1 μsec. A laser power at the time of reading was 0.5 mW.

(3) Recording layer protective characteristics:

After the optical recording medium was stored in an environment of 60° C. and 90% RH, the peel of the film and the occurrence of any cracks and pin-holes were evaluated with the naked eyes and an optical microscope. When the disk substrate optical recording medium was used, the optical recording medium whose recording characteristics (1) had been evaluated was stored for 3,000 hours in an environment of 60° C. and 90% RH, and recording and reading were carried out under the same condition as that of (1) to measure a change in the C/N value.

EXAMPLE 1

A sputtering apparatus used in this Example was one equipped inside its chamber with a device having a rotatable disk having three substrate holders and capable of rotating the substrate with the rotation of the disk and a device having three target fitting portions for positioning targets on the same circumference of a circle with its center coinciding with the axis of rotation of the disk while facing the substrates and equipped with a quartz crystal thickness monitor (XTC mfd. by INFICOM) for monitoring the deposition rate of each target.

A polycarbonate disk substrate (1.2 mm thick, 13 cm in diameter; with spiral grooves of 1.6 μm pitch), a Pyrex glass substrate (Corning 7059, 1.2 mm thick, 32mm×32 mm) and a rectangular polycarbonate substrate (1.2 mm thick, 32 mm×32 mm) were fitted to the three substrate fitting portions, respectively, and targets of ZnS, $MgF_2$ and $Sb_{55}Te_{40}Ge_5$ as a phase-change recording material were fitted to the three target fitting portions, respectively.

After pumping down the inside of the chamber to $2\times10^{-4}$ Pa, an Ar gas was introduced thereinto up to a pressure of $5\times10^{-1}$ Pa Next, the disk was rotated at 30 r.p.m. and, while power supply to the ZnS target and to the $MgF_2$ target was controlled so that the deposition rate was 90 mol % for ZnS and 10 mol % for $MgF_2$, the two targets were co-sputtered by the RF magnetron sputtering method. Sputtering was continued till the sum of their film thickness monitor values reached 150 nm and the dielectric layer was thus formed.

Next, the $Sb_{55}Te_{40}Ge_5$ target was sputtered by the RF magnetron sputtering method till the film thickness monitor value reached 90 nm, and the recording layer was formed on the dielectric layer.

Furthermore, another dielectric layer was laminated in a thickness of 150 nm on the recording layer in the same way as described above, thereby obtaining three optical recording media having mutually different substrates.

Next, the recording and erasing characteristics of the disk substrate optical recording medium were evaluated by the evaluation method described already. Initialization was effected at a linear velocity of 2.0 m/sec and a laser beam intensity of 3.5 mW, and recording was effected at a linear velocity of 6.0 m/sec, a frequency of 2.5 MHz, duty of 50% and a laser beam intensity of 12.0 mW, while erasing was effected at a linear velocity of 2.0 m/sec and a laser beam intensity of 5.0 mW. The C/N at the time of recording was 51.2 dB and the erasability was 45.6 dB. Thus, excellent recording and erasing characteristics could be obtained.

Furthermore, the cyclability of the Pyrex glass substrate optical recording medium were evaluated by the evaluation method described above. As a result, recording and erasing could be repeated stably more than 500,000 times under the condition of a laser beam pulse of 15 mW and 150 ns at the time of recording and a laser beam pulse of 3.0 mW and 1 μs at the time of erasing.

The recording layer protective characteristics of the rectangular polycarbonate substrate optical recording medium were evaluated by the evaluation method described above. As a result, neither the peel of the film nor the occurrence of cracks and pin-holes were observed at all even after the passage of 1,000 hours and excellent recording protective characteristics could be obtained.

EXAMPLES 2 & 3

Optical recording media were produced in the same way as in Example 1 with all of the substrate, the sputtering pressure condition, the layer structure and the film thickness of the dielectric layer and recording layer being the same as those of Example 1 except that $CeF_3$ and LiF targets were used in place of $MgF_2$ of Example 1. The deposition rate at the time of formation of the dielectric layer was 95 mol % for ZnS and 35 mol % for $CeF_3$ when $CeF_3$ was used and was 80 mol % for ZnS and 20 mol % for LiF when LiF was used. They will be referred to as Examples 2 and 3, respectively, hereinbelow.

Next, the recording and erasing characteristics were evaluated in accordance with the evaluation method described above by use of the disk substrate optical recording medium. Initialization of Example 2 was effected at a linear velocity of 2.0 m/sec and a laser beam intensity of 2.5 mW, and recording was effected at a linear velocity of 6.0 m/sec, a frequency of 2.5 MHz, duty of 50% and a laser beam intensity of 11.0 mW, while erasing was effected at a linear velocity of 2.0 m/sec and a laser beam intensity of 4.0 mW. The C/N at the time of recording was 50.4 dB and the erasability was 40.6 dB. Initialization of Example 3 was effected at a linear velocity of 2.0 m/sec and a laser beam intensity of 3.5 mW, and recording was effected at a linear velocity of 6.0 m/sec, a frequency of 2.5 MHz, duty of 50% and a laser beam intensity of 13.0 mW, while erasing was effected at a linear velocity of 2.0 m/sec and a laser beam intensity of 5.5 mW. The C/N at the time of recording was 50.8 dB and the erasability was 42.2 dB. Both Examples 2 and 3 provided extremely excellent recording and erasing characteristics.

When the cyclability were evaluated by use of the Pyrex glass substrate optical recording medium in accordance with the evaluation method described above, recording and erasing could be repeated stably more than 500,000 times under the condition of a laser beam pulse of 15 mW and 140 ns at the time of recording and a laser beam pulse of 3.5 mW and 1 μs at the time of erasing in Example 2 and under the condition of a laser beam pulse of 15 mW and 160 ns at the time of recording and a laser beam pulse of 3.7 mW and 1 µs at the time of erasing in Example 3.

When the recording layer protective characteristics were evaluated by use of the rectangular polycarbonate substrate optical recording medium in accordance with the evaluation method described above, neither the peel of the film nor the occurrence of cracks and pin-holes were observed at all even after the passage of 1,000 hours and excellent recording layer protective characteristics could be obtained.

EXAMPLE 4

Optical recording media were produced in the same way as in Example 1 with all of the substrate, the sputtering pressure condition, the layer structure and the film thickness of the dielectric layer and recording layer being the same as those of Example 1 except that a ZnSe target was used in place of ZnS of Example 1. At this time, the deposition rate at the time of the formation of the dielectric layer was set to 80 mol % for ZnS and 20 mol % for $MgF_2$.

Next, the recording and erasing characteristics were evaluated by use of the disk substrate optical recording medium in accordance with the evaluation method described above. Initialization was effected at a linear velocity of 2.0 m/sec and a laser beam intensity of 2.8 mW, and recording was effected at a linear velocity of 6.0 m/sec, a frequency of 2.5 MHz, duty of 50% and a laser beam intensity of 10.5 mW, while erasing was effected at a linear velocity of 2.0 m/sec and a laser beam intensity of 4.0 mW. The C/N at the time of recording was 51.8 dB and the erasability was 41.9 dB. Thus, extremely excellent recording and erasing characteristics could be obtained.

When the cyclability were evaluated by use of the Pyrex glass substrate optical recording medium in accordance with the evaluation method described above, recording and erasing could be repeated stably more than 500,000 times under the condition of a laser beam pulse of 15 mW and 150 ns at the time of recording and a laser beam pulse of 2.8 mW and 1 µs at the time of erasing.

When the recording layer protective characteristics were evaluated by use of the rectangular polycarbonate substrate optical recording medium in accordance with the evaluation method described above, neither peeling of the film nor the occurrence of cracks and pin-holes were observed at all even after the passage of 1,000 hours and excellent recording layer protective characteristics could be obtained.

COMPARATIVE EXAMPLE 1

A ZnS target and an $Sb_{55}Te_{40}Ge_5$ target were fitted to the three target holders of the sputtering apparatus used in Example 1. The ZnS target was sputtered by the RF magnetron sputtering method in the same way as in Example 1 with the same substrate and the same sputtering pressure condition as those of Example 1. Sputtering was carried out until the film thickness monitor value reached 150 nm to form the dielectric layer. Next, the $Sb_{55}Te_{40}Ge_5$ target was sputtered by the RF magnetron sputtering method until the film thickness monitor value reached 90 nm to form the recording layer on the dielectric layer. Furthermore, another dielectric layer was laminated in a thickness of 150 nm on the recording layer in the same way as described above, thereby obtaining three optical recording media having mutually different substrates.

Next, the recording and erasing characteristics were measured by use of the disk substrate optical recording medium in accordance with the evaluation method described above. Initialization was effected at a linear velocity of 0.5 m/sec and a laser beam intensity of 1.3 mW, and recording was effected at a linear velocity of 6.0 m/sec, a frequency of 2.5 MHz, duty of 50% and a laser beam intensity of 10.0 mW, while erasing was effected at a linear velocity of 2.0 m/sec and a laser beam intensity of 3.8 mW. The C/N at the time of recording was 50.0 dB and the erasability was 30.2 dB, so that no sufficient erasability could be obtained.

Furthermore, the cyclability were evaluated by use of the Pyrex glass substrate optical recording medium in accordance with the evaluation method described above. As a result, the recording layer got broken and neither recording nor erasing could be effected any more in the recording and erasing cycles of 200,000 times under the condition of a laser beam pulse of 15 mW and 130 ns at the time of recording and a laser beam pulse of 3.0 mW and 1 µs at the time of erasing.

When the recording layer protective characteristics were evaluated by use of the rectangular polycarbonate optical recording medium in accordance with the evaluation method described above, peeling occurred on the interface between the dielectric layer of the outermost layer and the recording layer after the passage of 100 hours and corrosion of the recording layer was observed at this peel portion.

COMPARATIVE EXAMPLE 2

Optical recording media were produced in the same way as in Comparative Example 1 with all of the substrate, the sputtering pressure condition, the layer structure and the film thickness of the dielectric layer and recording layer being the same as those of Comparative Example 1 except that an $MgF_2$ target was used in place of ZnS of Comparative Example 1.

Next, the recording and erasing characteristics were evaluated by use of the disk substrate optical recording medium in accordance with the evaluation method described above. Initialization could be effected under the condition of a linear velocity of 1.0 m/sec and a laser beam intensity of 3.5 mW but, since the refractive index of $MgF_2$ was as low as 1.37, the recording sensitivity was so low that even when the laser beam intensity was increased to 15.0 mW at a linear velocity of 6.0 m/sec, a frequency of 2.5 MHz and duty of 50%, no recording could be effected at all.

Furthermore, when the cyclability were evaluated by use of the Pyrex glass substrate optical recording medium in accordance with the evaluation method described above, the recording sensitivity was low, too, and no recording could be effected even by increasing the pulse width to 400 ns at a laser power of 15 mW.

When the recording layer protective characteristics were evaluated by use of the rectangular polycarbonate substrate optical recording medium in accordance with the evaluation method described above, the occurrence of cracks in the dielectric layer and in the recording layer was observed after the passage of 72 hours.

COMPARATIVE EXAMPLE 3

Optical recording media were produced in the same way as in Example 1 with all of the substrate, the sputtering pressure condition, the layer structure and the film thickness of the dielectric layer and recording layer being the same as those of Example 1 except that an SiO$_2$ target was used in place of MgF$_2$ of Example 1. At this time, the deposition rate at the time of the formation of the dielectric layer was set to 80 mol % for ZnS and 20 mol % for SiO$_2$.

Next, the recording and erasing characteristics were measured by use of the disk substrate optical recording medium in accordance with the evaluation method described above. Initialization was effected at a linear velocity of 0.5 m/sec and a laser beam intensity of 1.3 mW, and recording was effected at a linear velocity of 6.0 m/sec, a frequency of 2.5 MHz, duty of 50% and a laser beam intensity of 10.5 mW, while erasing was effected at a linear velocity of 2.0 m/sec and a laser beam intensity of 4.5 mW. The C/N at the time of recording was 51.5 dB and the erasability was 35.4 dB.

Furthermore, when the cyclability were evaluated by use of the Pyrex glass substrate optical recording medium in accordance with the evaluation method described above, the reflectance at the time of erasing (crystallization) dropped in the recording and erasing cycles of 300,000 times under the condition of a laser beam pulse of 15 mW and 110 ns at the time of recording and a laser beam pulse of 3.5 mW and 1 μs at the time of erasing, so that the difference in reflectance between this time and the time of recording (amorphous state) became lower than the initial value and good recording and erasing could not be effected any longer.

When the recording layer protective characteristics were evaluated by use of the rectangular polycarbonate substrate optical recording medium in accordance with the evaluation method described above, the occurrence of peeling on the interface between the dielectric layer of the outermost layer and the recording layer was observed after the passage of 500 hours.

The results described above are altogether tabulated in Table 1.

EXAMPLE 5

A polycarbonated disk substrate (1.2 mm thick and 13 cm in diameter; provided with spiral grooves of 1.6 μm pitch) was fitted to one of the three substrate holders of the same sputtering apparatus as that of Example 1 and a target of a mixture of ZnS and MgF$_2$ (ZnS:MgF$_2$=90:10, molar ratio), a target of Pd$_3$Ge$_{17}$Sb$_{30}$Te$_{50}$ as a phase-change optical recording material and an Au target were fitted to the three target fitting portions, respectively.

After pumping down the inside of the chamber to $1 \times 10^{-4}$ Pa, an Ar gas was introduced thereinto up to a pressure of $2 \times 10^{-1}$ Pa. Next, while the disk was being rotated at 60 r.p.m, a target of the mixture of ZnS and MgF$_2$ was sputtered by the RF magnetron sputtering method and sputtering was continued till the film thickness monitor value reached 150 nm. There was thus formed the dielectric layer.

Next, the Pd$_3$Ge$_{17}$Sb$_{30}$Te$_{50}$ target was sputtered by the RF magnetron sputtering method and sputtering was continued till the film thickness monitor value reached 60 nm, thereby forming the recording layer on the dielectric layer.

Another dielectric layer was deposited in a thickness of 170 nm on the recording layer in the same way as described above and the Au target was sputtered to form a 40 nm-thick Au layer. There was thus obtained a disk substrate optical recording medium. The structure of the recording medium was that of a substrate/dielectric layer/recording layer/dielectric layer/reflecting layer.

The recording characteristics were evaluated by use of this recording medium in accordance with the evaluation method described above. Initialization was effected at a linear velocity of 2.0 m/sec and a laser beam intensity of 4.0 mW. Recording was effected at a linear velocity of 11.5 m/sec, a frequency of 3.7 MHz and duty of 50% and a C/N ratio of at least 50 dB could be obtained at a laser beam intensity of 11.5 mW or more. The C/N was 55.7 dB at a laser beam intensity of 15.0 mW, and the erasability was 34.7 dB at linear velocity of 11.5 m/sec and a laser beam intensity of 9.0 mW.

Next, the recording layer protective characteristics were evaluated in accordance with the evaluation method described above. Neither peeling of the film nor the occurrence of cracks and pin-holes were observed at all even after the passage of 3,000 hours and excellent recording layer protective characteristics could be obtained. The C/N dropped by only 0.3 dB after the passage of 3,000 hours in comparison with the initial C/N.

EXAMPLE 6

Optical recording media were produced in the same way as in Example 5 with all of the substrate, the sputtering pressure condition, the layer structure and the film thickness of each layer being the same as those of Example 5 except that a target of a mixture of ZnSe and MgF$_2$ (ZeSe:MgF$_2$=85:15, molar ratio) was used in place of the mixture of ZnS and MgF$_2$ of Example 5.

The recording characteristics were evaluated by use of the disk substrate optical recording medium by the evaluation method described above. Initialization and recording were effected under the same conditions as in Example 5. A C/N of at least 50 dB was obtained at a laser beam intensity of 10.5 mW or more. The C/N was 56.2 dB at a laser beam intensity of 13.0 mW, and the erasability was 37.5 dB at a linear velocity of 11.5 m/sec and a laser beam intensity of 8.0 mW.

Next, the recording layer protective characteristics were evaluated in accordance with the evaluation method described above. As a result, neither peeling of the film nor the occurrence of cracks and pin-holes were observed at all even after the passage of 3,000 hours and excellent recording layer protective characteristics could be obtained. The C/N after the passage of 3,000 hours dropped by only 0.5 dB in comparison with the initial C/N.

COMPARATIVE EXAMPLE 4

Optical recording media were produced in the same way as in Example 5 with all of the substrate, the sputtering pressure condition, the layer structure and the film thickness of each layer being the same as those of Example 5 except that a ZnS target was used in place of the mixture of ZnS and MgF$_2$ (ZnS:MgF$_2$=90:10, molar ratio) in Example 5.

The recording characteristics were evaluated by use of the disk substrate optical recording medium in accordance with the evaluation method described above. Initialization and recording were effected under the same conditions as in Example 5. A C/N of at least 50 dB was obtained at a laser beam intensity of 13.0 mW or more. The C/N was 51.8 dB at a laser beam intensity of 15.0 mW, and the erasability was 32.5 dB at a linear velocity of 11.5 m/sec and a laser beam intensity of 10.0 mW.

Next, the recording layer protective characteristics were evaluated in accordance with the evaluation method described above. As a result, neither peeling of the film nor the occurrence of cracks and pin-holes were observed even after the passage of 3,000 hours, but the C/N ratio after 3,000 hours dropped by 4.5 dB from the initial C/N.

The results described above are altogether tabulated in Table 2.

As is obvious from the results given above, it can be understood that the optical recording medium using the mixture containing the chalcogen compound and the fluoride compound as the dielectric layer has extremely excellent recording layer protective characteristics, recording and erasing cycle characteristics and recording and erasing characteristics.

TABLE 1

| | Dielectric layer | Recording/erasing characteristics (dB) C/N | Recording/erasing characteristics (dB) erasability | Recording/erasing cycle characteristics | Recording layer protective characteristics |
|---|---|---|---|---|---|
| Ex. 1 | ZnS 90 mol %, MgF$_2$ 10 mol % | 51.2 | 45.6 | 500,000 times or more | no peel, crack and pin-hole |
| Ex. 2 | ZnS 95 mol %, CeF$_3$ 5 mol % | 50.4 | 40.6 | 500,000 times or more | no peel, crack and pin-hole |
| Ex. 3 | ZnS 80 mol %, LiF 20 mol % | 50.8 | 42.2 | 500,000 times or more | no peel, crack and pin-hole |
| Ex. 4 | ZnSe 80 mol %, MgF$_2$ 20 mol % | 51.8 | 41.9 | 500,000 times or more | no peel, crack and pin-hole |
| Comp. Ex. 1 | ZnS | 50.0 | 30.2 | recording layer broken after 200,000 cycles | peel occurred and recording layer corroded at peel portion |
| Comp. Ex. 2 | MgF$_2$ | | | failed in recording due to low sensitivity | cracks occurred on dielectric and recording layers |
| Comp. Ex. 3 | ZnS 80 mol %, SiO$_2$ 20 mol % | 51.5 | 35.4 | poor erasing after 300,000 cycles | occurrence of peel |

TABLE 2

| | Dielectric layer | Recording sensitivity (laser power providing C/N of at least 50 dB) | Erasability (dB) | Recording layer protective characteristics (drop of C/N) |
|---|---|---|---|---|
| Ex. 5 | ZnS 90 mol %, MgF$_2$ 10 mol % | 11.5 mW | 35.7 | 0.3 |
| Ex. 5 | ZnSe 85 mol %, MgF$_2$ 15 mol % | 10.5 mW | 37.5 | 0.5 |
| Comp. Ex. 4 | ZnS | 13.0 mW | 32.5 | 4.5 |

The optical recording medium in the present invention uses the mixture containing the chalcogen compound and the fluoride compound as the dielectric layer as described above. Therefore it can provide the excellent effects and is useful as the optical recording medium.

What is claimed is:

1. An optical recording medium comprising, in sequence, a substrate, a first dielectric layer, a recording layer and a second dielectric layer, with at least one of said dielectric layers comprising a mixture containing at least a chalcogen compound and a fluoride compound, wherein said recording layer is made of a material which records information by a phase change.

2. An optical recording medium according to claim 1, wherein said chalcogen compound is at least one member selected from the group consisting of ZnS, ZnSe and ZnTe and said fluoride compound is at least one member selected from the group consisting of MgF$_2$, CeF$_3$, ThF$_4$, LiF and Na$_3$AlF$_6$.

3. An optical recording medium according to claim 1, wherein said mixture containing said chalcogen compound and said fluoride compound is at least one member selected from the group consisting of the combinations of ZnS with MgF$_2$, ZnSe with MgF$_2$, ZnTe with MgF$_2$, ZnS with CeF$_3$ and ZnS with ThF$_4$.

4. An optical recording medium according to claim 1, wherein said chalcogen compound is at least one member selected from the group consisting of ZnS and ZnSe and said fluoride compound is MgF$_2$.

5. An optical recording medium according to any of claims 1 through 4, wherein the mixing ratio of said chalcogen compound to said fluoride compound is from 100:1 to 1:20 in terms of a molar ratio.

6. An optical recording medium according to any of claims 1 through 4, wherein the mixing ratio of said chalcogen compound to said fluoride compound is from 50:1 to 1:2 in terms of a molar ratio.

7. An optical recording medium according to any of claims 1 through 4, wherein a reflecting layer is provided on said second dielectric layer.

8. An optical recording medium according to claim 7, wherein said first dielectric layer comprises a mixture containing said chalcogen compound and said fluoride compound and said second dielectric layer is a nitride or carbide of a metal or metalloid.

9. An optical recording medium according to claim 2, wherein the composition of said recording layer comprises antimony (Sb); germanium (Ge); and tellurium (Te) and at least one kind of metal selected from the group consisting of palladium (Pd), nickel (Ni), silver (Ag) and gold (Au).

10. An optical recording medium according to claim 1, wherein said first dielectric layer and/or said second dielectric layer comprises a mixture containing ZnS and MgF$_2$ at from 50:1 to 1:2 in terms of a molar ratio, and the composition of said recording layer is expressed by the following formula:

$$(Pd_xSb_yTe_{1-x-y})_{1-z}(Te_{0.5}Ge_{0.5})_z$$

$0.01 \leq x \leq 0.1$ $0.45 \leq y \leq 0.65$ $0.2 \leq z \leq 0.4$ wherein each of x, y, z and 0.5 represents the atomic fraction of each element.

11. An optical recording medium according to claim 8, wherein said first dielectric layer and/or said second dielectric layer is a dielectric layer comprising a mixture containing ZnS and $MgF_2$ at a mixing ratio of from 50:1 to 1:2 in terms of a molar ratio, and the composition of said recording layer is expressed by the following formula:

$(Pd_xSb_yTe_{1-x-y})_{1-z}(Te_{0.5}Ge_{0.5})_z$ $0.01 \leq x \leq 0.1$ $0.45 \leq y \leq 0.65$ $0.2 \leq z \leq 0.4$ wherein each of x, y, z and 0.5 represents the atomic fraction of each element.

12. An optical recording medium according to claim 8, wherein said reflecting layer comprises Au, Al, NiCr or HF.

13. An optical recording medium according to claim 8, wherein the mixing ratio of said chalcogen compound to said fluoride compound is from 100:1 to 1:20 in terms of molar ratio.

14. An optical recording medium according to claim 8, wherein the mixing ratio of said chalcogen compound to said fluoride compound is from 40:1 to 1:2 in terms of molar ratio.

* * * * *